(12) United States Patent
Hayosh

(10) Patent No.: US 6,351,553 B1
(45) Date of Patent: Feb. 26, 2002

(54) QUALITY ASSURANCE OF CAPTURED DOCUMENT IMAGES

(75) Inventor: Thomas David Hayosh, Bloomfield Hills, MI (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/261,840

(22) Filed: Mar. 3, 1999

(51) Int. Cl.⁷ .................................................. G06K 9/00
(52) U.S. Cl. ...................................................... 382/139
(58) Field of Search ................................. 382/100, 115, 382/116, 135, 137, 138, 139, 140; 356/71; 705/1, 16, 17, 18, 26, 27, 33, 34, 35, 39, 42, 44, 45; 283/57, 58, 59, 60.1, 904; 902/1, 4, 5, 6, 24, 25, 27

(56) References Cited

U.S. PATENT DOCUMENTS

| | | | | |
|---|---|---|---|---|
| 3,949,363 A | * | 4/1976 | Holm | 382/140 |
| 4,523,330 A | | 6/1985 | Cain | 382/140 |
| 4,888,812 A | | 12/1989 | Dinan et al. | 382/140 |
| 5,221,830 A | | 6/1993 | Kern | 705/30 |
| 5,237,156 A | | 8/1993 | Konishi et al. | 235/375 |
| 5,237,159 A | | 8/1993 | Stephens et al. | 705/30 |
| 5,473,143 A | * | 12/1995 | Vak et al. | 235/380 |
| 5,532,464 A | * | 7/1996 | Josephson et al. | 235/379 |
| 5,689,579 A | | 11/1997 | Josephson | 382/137 |
| 5,781,654 A | | 7/1998 | Carney | 382/137 |
| 5,784,503 A | | 7/1998 | Bleecker, III et al. | 382/306 |
| 5,832,463 A | * | 11/1998 | Funk | 705/35 |
| 5,930,778 A | * | 7/1999 | Geer | 705/45 |

* cited by examiner

*Primary Examiner*—Andrew W. Johns
*Assistant Examiner*—Shervin Nakhjavan
(74) *Attorney, Agent, or Firm*—David G. Rasmussen; Mark T. Starr

(57) ABSTRACT

A method and apparatus are used to provide quality assurance for the electronic transfer of document image files, for example, between banks. The documents may be, in the case of a bank, negotiable instruments, checks, deposit slips or other transactional documents. The document image file contains an image tag file and associated image data file. An image tag file contains first quality assurance data. An image data file contains second quality assurance data. The quality assurance data may be a MICR line from the document. A first reader extracts the first quality assurance data from the image tag file. A second reader reads the second quality assurance data from the image data file. A comparator receives the first and second sets of quality assurance data from the first and second readers and compares the first and second sets of quality assurance data to find correspondence between the data. The level of the correspondence provides an indicator of the quality of the image data file and associated image tag file data.

36 Claims, 4 Drawing Sheets

QUALITY ASSURANCE OF CAPTURED DOCUMENT IMAGES

BACKGROUND OF THE INVENTION

1. Field of the Invention

The invention relates to the electronic transfer of document images, for example, between banks and more specifically to a method and apparatus for providing quality assurance of an electronically transferable image data file and associated image tag file of a document.

2. Description of the Related Art

Figure 1:
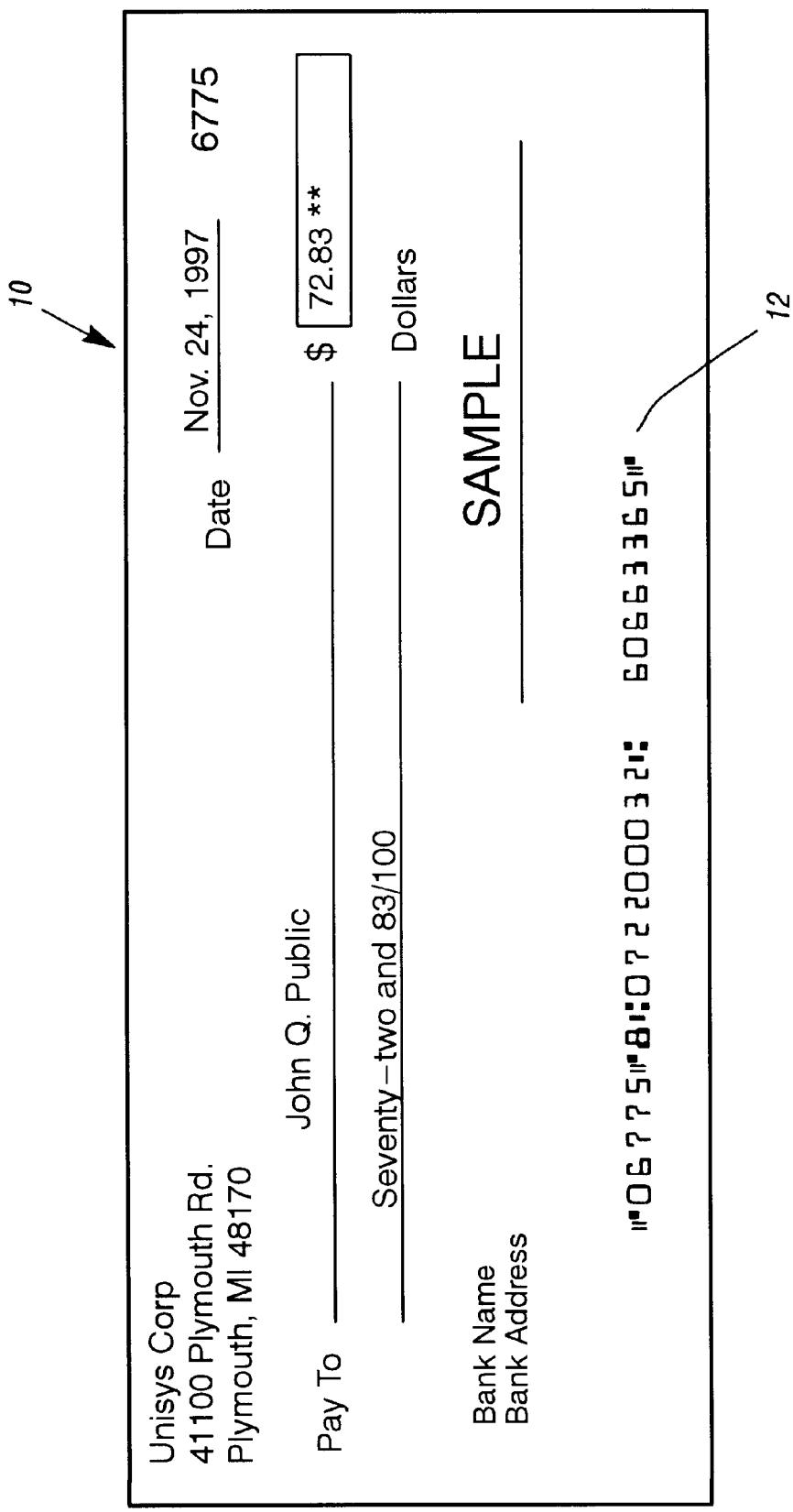

As is well known and described in U.S. Pat. No. 5,221,830 by Kern and assigned to the present assignee, a very common activity within a bank involves the processing of deposits made by the bank's customers. A customer is typically one who has a checking account at the bank and, from time-to-time, makes a deposit for the purpose of depositing to his/her account one or more checks, which the customer has received from others. These checks may be drawn on the same bank (On-us checks) or on other banks. FIG. 1 illustrates the front side of a typical check 10.

In order to make a deposit, a customer ordinarily fills out a deposit ticket listing the amount of each check to be deposited, and the total of all checks. A deposit ticket has a code line similar to the code line 12 provided at the bottom of the front side of check 10. This code line is typically both humanly-readable and machine-readable. It contains information which the bank uses for processing, such as the bank on which the document is drawn, a routing/transit number, the account number of the person who wrote or made out the check or deposit ticket, and often a transaction code indicating the presence of a bank's internal document. Code line 12 is usually comprised of well-known MICR (Magnetic Ink Character Recognition) data, but may alternatively be OCR (Optical Character Recognition) data. For convenience, it will be assumed for the remainder of this description that the code line contains MICR data.

A bank receives deposit tickets and associated checks for further processing from a variety of sources, such as from the bank's tellers, through-the-mail, and from automated teller machines. When the transaction is made at a teller window, the customer may also choose to receive a certain amount of cash. In such a case, the teller will then include with the check(s) and deposit ticket of the transaction, and a cash paid out slip for the corresponding cash amount. This cash paid out slip also contains a MICR code line.

Instead of receiving cash, the customer might wish to deposit cash into his account, in which case the customer would enter the appropriate amount onto the deposit ticket. The teller would then include with the check(s) and deposit slip of the transaction, a cash paid in slip, which would be generally similar to the cash paid out slip, except that it would designate cash paid in instead of cash paid out.

The deposit ticket along with its associated checks 10, and any cash paid in or paid out slips constitute a transaction. Other documents, such as mortgage and credit card payments could also be included in a transaction. Assuming no errors have been made, the "NET DEPOSIT" line on the front side of the deposit ticket should equal the algebraic sum of the associated check amounts and any cash paid in or paid out amount, and also the amounts of any other types of transaction items. When this equality is present, the transaction is said to be "balanced."

It will be appreciated that a bank is required to process large quantities of transactions, such as described above, every working day for its internal accounts and to send out checks drawn on other banks for collection. To make this process more efficient, current banking practices require that MICR data be placed on each check.

Figure 2:
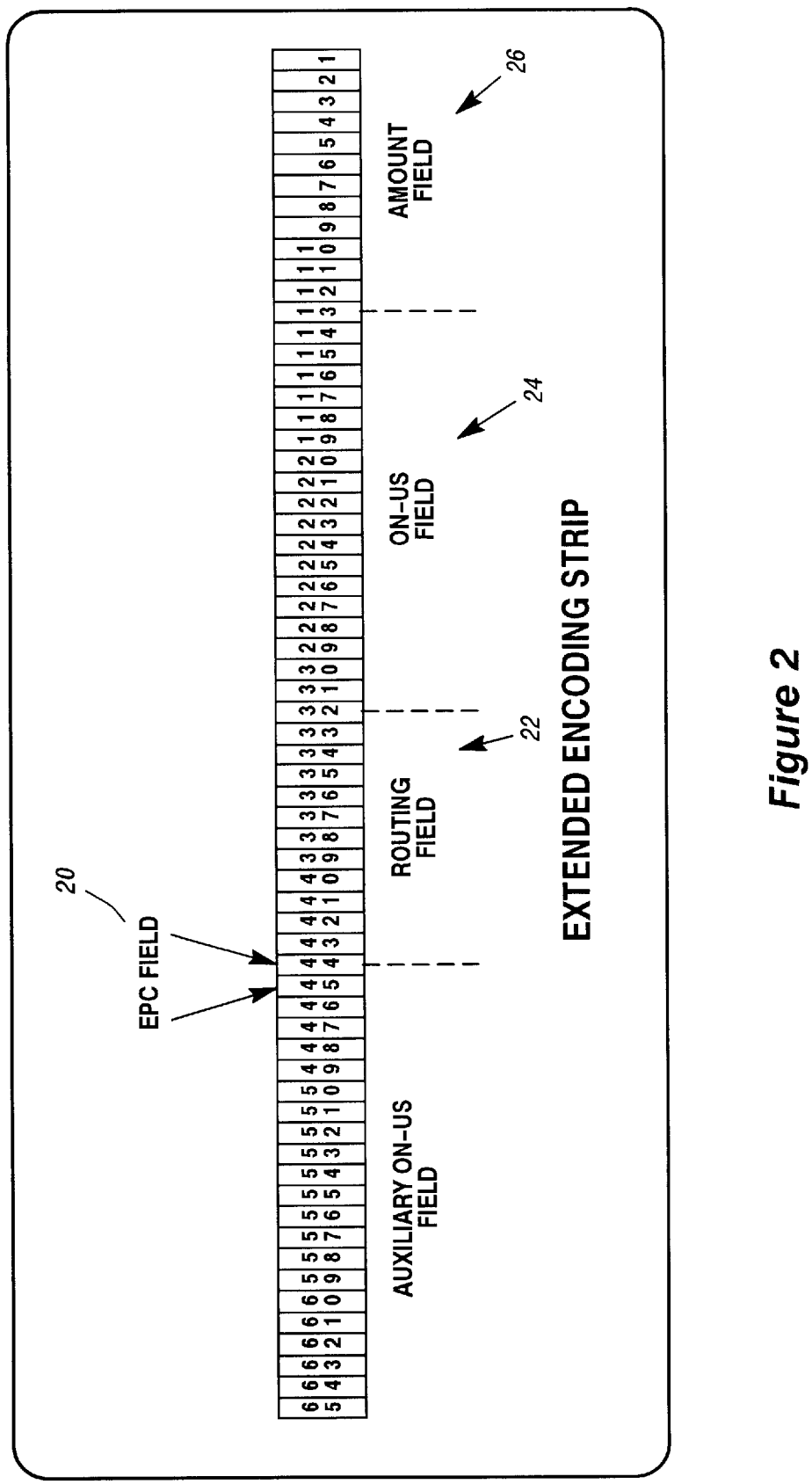

This MICR data 12 is placed in the MICR print band which is a horizontal band near the bottom of the check. The details of the MICR line are shown in FIG. 2. An external processing code EPC field 20, shown in field position 44, contains information for outside processors of the check. The field immediately to the right of the EPC field is routing field 22. This field is in positions 33–43 and contains the routing number of the drawee institution. The field to the right of the routing field is the on-us field 24. This field, in positions 14–31, is reserved for use by the drawee institution and normally contains the maker's account number. On personal size checks, this field also contains the check number and may also contain processing code information unique to the drawee institution.

The right-most field in the MICR line is the amount field 26 in positions 2–11. This field is left blank until it is completed by the institution of first deposit. When the check first enters the banking system, the amount is encoded using the information obtained from the convenience amount field and amount in words.

There are field code symbols on the ends of each field and blank spaces in a number of locations throughout the fields. For example, the routing field is bounded by transit symbols, and the amount field is bounded by amount symbols.

The contents of the MICR line are controlled by the drawee institution following rules established for the high speed processing of checks provided in The American National Standard for Financial Services X9.13, Placement and Location of Magnetic Ink Printing (MICR). Adherence to these rules is required to enable rapid clearing of documents between financial institutions. A key portion of the definition of the structure and content of the fields in the MICR line (provided in ANSI Standard X9.13) is associated with the routing and amount fields. The numeric contents of the routing field indicate the drawee financial institution, and consists of two groups of four digits, followed by a Mod 10 check digit. The numeric contents of the amount field indicate the value of the check in cents.

It will be appreciated that once a bank has processed a large quantity of transactions, such as described above, the bank needs to send out checks drawn on other banks for collection. To send checks to another bank, one way is to first generate an electronic check presentment (ECP) file, which contains a listing of MICR code lines and check amounts and other data for every check that is payable at the transit bank. This file is sent by electronic means as an advance information file in order to protect against fraud and reduce check float. A short time after the ECP file has been sent electronically, the paper checks corresponding to all items in the ECP file are then physically sent.

To make this process more efficient and less costly it would be desirable to be able to digitize or image the transit paper checks creating a compressed image electronic file and transmit the electronic file to the receiving bank. One problem is assuring that the quality, i.e. the integrity, of the data is maintained during generation of the file and transmission to the receiving bank. Several problems may occur with such a file:

a) The image data becomes disassociated with its specific image header data containing the image tags.

b) The compressed image data is corrupted.

c) The compressed image is truncated at its lower boundary, which is the most likely place for truncation if it is to occur.

d) There is poor image legibility of a check.

e) There was an undetected failure of the image camera, image processing algorithms, or image compression algorithms It would be desirable to have a system for the imaging of paper checks or other documents where the images are assembled into an electronic file and sent to a receiving bank that would provide assurance that the problems described hereinbefore do not exist.

SUMMARY

The invention is a method and apparatus used to provide quality assurance for the electronic transfer of document image files, for example, between banks. The documents may be, in the case of a bank, negotiable instruments, checks, deposit slips or other transactional documents. The document image file contains an image tag file and associated image data file. The image tag file contains first quality assurance data. The image data file contains second quality assurance data. The quality assurance data may be a MICR line froma the document.

A first reader extracts the first quality assurance data from the image tag file. A second reader reads the second quality assurance data from the image data file. A comparator receives the first and second sets of quality assurance data from the first and second readers and compares the first and second sets of quality assurance data to find correspondence between the data. The level of the correspondence provides an indicator of the quality of the image data file and associated image tag file data.

DETAILED DESCRIPTION OF THE INVENTION

Figure 3:
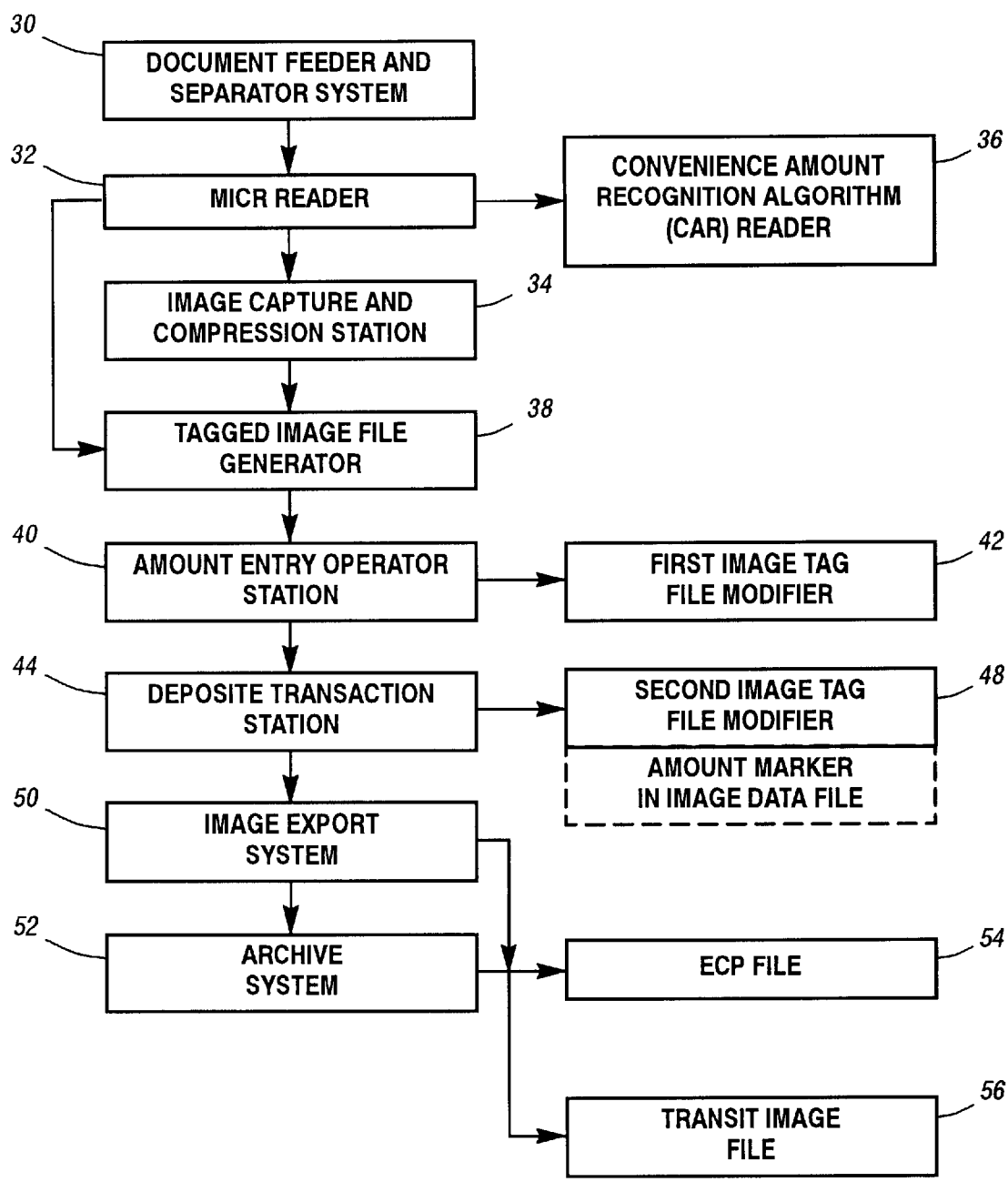
Figure 4:
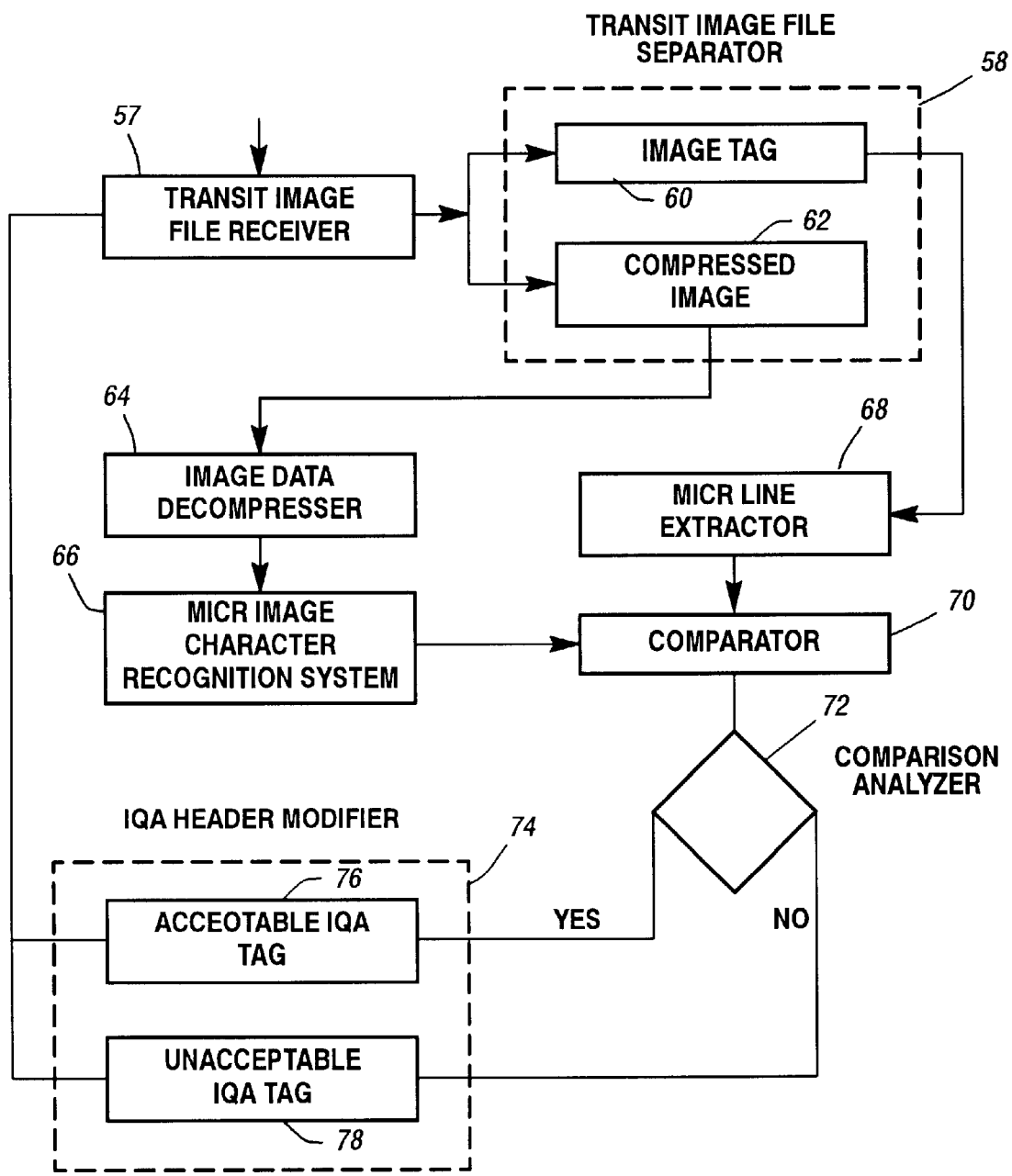

FIGS. 3 and 4 show a system for providing quality assurance for an electronically transferred image file of a document. Any document electronically transferred could be considered, although, in our preferred embodiment the documents considered are banking transaction documents. FIG. 3 shows how a check having a MICR line is processed by a depositing bank to prepare it to be sent to a receiving bank. In general the check document flows through an image capture system containing a convenience amount recognition (CAR) reader system.

More specifically, document feeder and separator system 30 feeds the documents and separates a desired document from other documents in a stack. The document is aligned in a track, and passed to a magnetic ink character recognition (MICR) reader 32, for reading the pre-printed characters from the MICR code line contained on the lower ⅝ inch of a check. The invention could also include characters read by an optical character recognition (OCR) reader.

Following MICR reading and endorsing, the check is sent to the image capture and compression station 34, which includes an image camera, which scans vertically. A uniform document speed provides the effective raster scanning until the entire document is scanned and stored in a temporary register. The scanning is done in such a manner that the MICR characters are the last or near the last characters scanned in each scan cycle. This assures that if the MICR characters are found to be of good quality in the quality assurance process it is likely that the characters scanned before the MICR characters are probably good quality also. From the temporary register, conventionally, the data is read out from top to bottom and left to right providing a new reference point for the starting position of the image as the upper left hand corner.

A portion of the image, which contains the amount in figures, is sent to a convenience amount recognition (CAR) algorithm reader 36, either in hardware or software, for an attempt at reading the amount of the check. If any portion of the full amount is recognized, that data is passed to a tagged image file generator 38 along with the data contained in the MICR code line. The image data is image processed and compressed to remove redundant data while the image tag data is attached to the compressed image data usually as a header file.

In an image proof of deposit (POD) application, CAR is generally successful about 50% of the time so documents that CAR did not fully read are presented to an amount entry operator station 40 where an operator views images of documents and enters the amount on a keyboard. A signal is sent to an image tag file modifier 42, which modifies the document image tag file to include the new or corrected amount data.

The image data file and image tag file for each document is passed to a deposit transaction station 44. Every document scanned is identifiable as either a debit or a credit, where a credit is a deposit ticket or cash in slip and a debit is a check or cash out slip. At deposit transaction station 44 the deposit transaction document is trial balanced. If the transaction is in balance, because the sum of all debits is equal in value to the sum of all credits, all the images in that transaction are released for further processing. For those transactions that are not in balance an operator will look at suspect items to find an error(s) and makes sure all debt totals equal all credit totals. The balance operator is responsible for correcting any errors made by the depositor, CAR or amount entry operator before the images for that transaction are released. Any corrections in the amounts, if any, are made again and recorded in the tags of the appropriate images in a second image tag modifier file 48. In an alternative embodiment, described hereinafter, where the amount is not MICR encoded on the check, an amount marker may be written in the image data file thus including the amount information in the image data file.

In prior art systems using documents rather than electronic images, at this point the documents may be released for power encoding and sending to other banks or for items which are payable by the same bank in which they were deposited they will be filed for later statement rendering. Alternatively in the invention, using an image exchange environment, the documents may be truncated, i.e. not sent out to other banks, and the images sent out instead from the image export system 50. In order to maintain a record of every transaction, the bank must archive each image and image file tag in an archive system 52. For transit items to another bank, an Electronic Check Presentment (ECP) file, 54, is generated, which contains a listing of MICR code lines including check amounts and other data for every item with an image that is payable at the transit bank. This file is sent by electronic means as an advance information file in order to protect against fraud and reduce check float. A short time after the ECP file has been sent; the transit image file 56, having the image file and image tag file, of all items corresponding to the ECP file is then sent. It is the responsibility of the sending financial institution to warrant that the images sent are properly captured and compressed such that when needed by the receiving financial institution they are correct and usable. Depending on the bank's system, the transit ECP file 54 and transit image file 56 may be generated either before at 50 or after they have been sent to the archive system at 52.

To provide assurances that images exist and when viewed match the check data used to sort and archive images it is desired that there be an automated system in place to monitor this process and report any errors. This process should be performed at both the sending as well as the receiving institution to reduce problems due to missing and mismatched images. For example, when images are decompressed and read by an Image Character Recognition (ICR) system, some assurance is also given regarding image legibility. It is not necessary that all images are examined and checked with the data in its corresponding tag file in order to gain confidence of outgoing or incoming quality. If one assumes that the process of producing images and image tags with hardware and software is a controlled process then monitoring the process on a sampled basis instead of a full time basis will yield the high degree of confidence that a user desires.

FIG. 4 describes the apparatus and methods of the invention used to assure that the transit data in the transit image file 56 prepared by the sending bank and sent to the receiving bank maintains its integrity. The process is the same for images that are sent to other banks as well as for images that are received from other banks. For simplicity, only the process of qualifying images before sending them to the paying bank will be described. Qualifying the images means that a statistically significant sampling and testing of the actual images in the transit image file 56 will take place that will allow a judgment to be made regarding the image quality with a certain confidence level on the remaining images that were not examined.

The quality assurance process in general includes having the MICR line data in both the image tag and image data of the transit data. The image tag and the image MICR line data are then compared. If the two sets of MICR line data are consistent then this consistency is a measure of assurance of the quality of the image data to be sent and that the right image tag is associated with the right image data. The details of the apparatus and methods in FIG. 4 are as follows.

A transit image file receiver 57 receives the electronic transmission of the transit image file 56. The transit image file 56 contains the image tag (i.e. image header) 60 and the compressed image data 62. The image tag often utilizes a standard format called TIFF, which stands for tagged image file format where the elements are logically identified in an image file directory consisting of the TIFF tags and their values. The TIFF tags describe the attributes of the image in accordance with the definitions for standard tags. The TIFF standard also allows for the use of private tags with tags numbered 32768 or higher to store information meaningful to a limited set of users. A transit image file separator 58 separates the image tag 60 and compressed image data 62. Images that may be randomly chosen from image data 62 are selected to be tested and forwarded to an image data decompresser 64 to be decompressed. From each selected image, the lower ⅝ inch horizontal strip is sent to Image Character Recognition (ICR) system 66 (i.e. second reader), having an ICR algorithm such as Quickstrokes by Mitek Systems, Inc for recognition of the MICR code line using the E13-B MICR font.

Normal industry practice is that the amount data is MICR encoded on the checks and appears in the image data file 62. However, in some cases the normal power encoding of the amount field on On-us as well as transit checks is not desired because it would cause an unnecessary expense to encode paper that would be soon truncated or discarded. This means that the image data file 62 would not contain amount information necessary to complete aL full MICR code line to be used in the quality assurance process. In order to provide this amount information in the image data file 62 the amount field data can be inserted into the compressed image data file 62 using private markers that are ignored by the decompressor 64. These markers may be added to the image file in the second image tag file modifier 48 in FIG. 3. This embedded amount marker data could be easily extracted by a modification of the image data decompresser 64 that parses the amount marker data from the compressed image data stream and makes this data available to the comparator 70 along with the MICR image code line data from ICR system 66. This data would be equivalent to the MICR image code line data for a check that had MICR amount data encoded on the check.

It may be desirable to decompress every image in some instances although in high volume export cases, the time may not be available to execute 100% inspection so it will suffice to sample images. Experience will form the rationale for selecting the necessary sample ratio to reduce the risk of sending or receiving mismatched or poor quality images.

The image tag 60 for each of the selected compressed images 62 is sent to MICR line extractor 68 (i.e. first reader) to extract the MICR code line data. The image tag 60 MICR code line data (i.e. first quality assurance data) is then compared at comparator 70 to the MICR line data (and amount marker data) extracted from the image data from ICR system 66 (i.e. second quality assurance data). If a match of all or most of the characters is made a comparison analyzer 72 then sends a signal to an image quality assurance (IQA) header modifier 74 to write a tag value 76 indicating a MICR code line match was made. In the event that the characters from the image don't match the data from the tag or the image characters can't be read, that event would also be written as a tag value 78 indicating an unacceptable IQA value. IQA tags, which indicate a potential problem, would allow those affected images to be examined by an operator to make a final determination on the status of the images.

For those images that have an acceptable IQA tag values 76 the following quality assurance standards have been met.
  a) The image is associated with the correct header data.
  b) The compressed image is uncorrupted.
  c) The image is unlikely truncated. The MICR line is at the bottom of the check and has been read from the decompressed image and found to match the MICR code line from the image tag file. This means the image is not truncated at its lower boundary, which is the most likely place for truncation if it were to occur.
  d) Image legibility on the front image of a check is guaranteed to the extent that the gray scale image MICR. Line data was read by a specific character recognition algorithm. This action ensures that there was no undetected failure of the image camera, image processing algorithms, or image compression algorithm.

As disclosed previously, bank documents have a MICR code line that contains transactional data. For quality assurance purposes this has the advantage that the transactional data is already available in the bank documents. However, other data either in printed bar code or derived by OCR could also be used for quality assurance purposes.

While the preferred embodiments of the invention have been shown and described, numerous variations and alternative embodiments will occur to those skilled in the art. Accordingly, it is intended that the invention be limited only in terms of the appended claims.

I claim:

1. A method for providing quality assurance for an electronically transferable image data file and associated image tag file of a document, comprising the steps:

extracting first quality assurance data from said image tag file, extracting second quality assurance data from said image file, and comparing said first quality assurance data and said second quality assurance data to find correspondence between said first and second quality assurance data, the level of said correspondence providing an indicator of the quality of said image data file and associated image tag file data.

2. The method of claim 1 where said first quality assurance data from said image tag file and said second quality assurance data from said image data file are representations of MICR characters on said document.

3. The method of claim 2 wherein said image data file is created by scanning said document, said MICR characters positioned on said document so as to be near the end of the scan in each scan cycle.

4. The method of claim 1 wherein said first and second sets of quality assurance data are transactional data from said documents sufficient to provide quality assurance.

5. The method of claim 4 wherein transactional data includes data from banking transaction documents.

6. The method of claim 4 wherein said transactional data is a representation of MICR characters on said document.

7. The method of claim 4 where said first and second quality assurance data contain a routing field from said transactional data.

8. The method of claim 7 where said first and second quality assurance data contain an amount field from said transactional data.

9. The method of claim 5 where said first and second quality assurance data contain an amount field from said transactional data.

10. The method of claim 5 where said first and second quality assurance data contain an on-us field from said transactional data.

11. The method of claim 11 where said first and second quality assurance data contain a routing field from said transactional data.

12. The method of claim 11 where said first and second quality assurance data contain an amount field.

13. The method of claims 7, 8, 9, 10, 11 or 12 where said first and second quality assurance data are representations of MICR characters on said document.

14. The method of claim 4 wherein said first and second sets of quality assurance data are representations of MICR characters on said document.

15. A method for providing quality assurance for an electronically received image data file and associated image tag file of a document, comprising the steps:

extracting first quality assurance data from said image tag file, extracting second quality assurance data from said image file, and comparing said first quality assurance data and said second quality assurance to find correspondence between said first and second quality assurance data, the level of said correspondence providing an indicator of the quality of said image data file and associated image tag file data.

16. The method of claim 15 where said first quality assurance data from said image tag file and said second quality assurance data from said image data file are representations of MICR characters on said document.

17. A system for providing quality assurance for an electronically transferable image file of a document, said image file having an associated image tag file, comprising:

said image tag file having first quality assurance data, said image file having second quality assurance data, a first reader for extracting said first quality assurance data from said image tag file, a second reader for reading said second quality assurance data from said image file, and a comparator receiving said first quality assurance data and said second quality assurance from said first and second readers for comparing said first quality assurance data and said second quality assurance to find correspondence between said first and second quality assurance data, the level of said correspondence providing an indicator of the quality of said image data file and associated image tag file data.

18. The system of claim 17 where said first quality assurance data from said image tag file and said second quality assurance data from said image data file are representations of MICR characters on said document.

19. The system of claim 18 wherein said image data file is created by scanning said document, said MICR characters positioned on said document so as to be near the end of the scan in each scan cycle.

20. The system of claim 17 wherein said first and second sets of quality assurance data are transactional data from said documents sufficient to provide quality assurance.

21. The system of claim 20 wherein transactional data includes data from banking transaction documents.

22. The system of claim 20 wherein said transactional data is a representation of MICR characters on said document.

23. The system of claim 20 where said first and second quality assurance data contain a routing field from said transactional data.

24. The system of claim 23 where said first and second quality assurance data contain an amount field from said transactional data.

25. The system of claim 21 where said first and second quality assurance data contain an amount field from said transactional data.

26. The system of claim 21 where said first and second quality assurance data contain an on-us field from said transactional data.

27. The system of claim 25 where said first and second quality assurance data contain a routing field from said transactional data.

28. The system of claim 27 where said first and second quality assurance data contain an amount field.

29. The system of claims 23, 24, 25, 26, 27 or 28 where said first and second quality assurance data are representations of MICR characters on said document.

30. The system of claim 20 wherein said first and second sets of quality assurance data are representations of MICR characters on said document.

31. A system for providing quality assurance for an electronically received image file of a document, said image file having an associated image tag file, comprising:

said image tag file having first quality assurance data, said image file having second quality assurance data, a first reader for reading said first quality assurance data from said image tag file, a second reader for reading said second quality assurance data from said image file, and a comparator receiving said first quality assurance data and said second quality assurance from said first and second readers for comparing said first quality assurance data and said second quality assurance to find correspondence between said first and second quality assurance data, the level of said correspondence providing an indicator of the quality of said image data file and associated image tag file data.

32. The system of claim 31 where said first quality assurance data from said image tag file and said second quality assurance data from said image data file are representations of MICR characters on said document.

33. The system of claim 31 wherein said first and second sets of quality assurance data are transactional data from said documents sufficient to provide quality assurance.

34. The system of claim 33 wherein transactional data includes data from banking transaction documents.

35. The system of claim 34 wherein said transactional data is a representation of MICR characters on said document.

36. The system of claim 33 wherein said first and second sets of quality assurance data are representations of MICR characters on said document.

* * * * *